United States Patent [19]

Shirasaki

[11] Patent Number: 5,034,646
[45] Date of Patent: Jul. 23, 1991

[54] VIBRATION MOTOR

[75] Inventor: Takayuki Shirasaki, Yokohama, Japan

[73] Assignee: Canon Kabushiki Kaisha, Tokyo, Japan

[21] Appl. No.: 469,944

[22] Filed: Jan. 25, 1990

[30] Foreign Application Priority Data

Jan. 25, 1980 [JP] Japan .................................. 1-15675

[51] Int. Cl.⁵ ............................................ H01L 41/08
[52] U.S. Cl. .................................................... 310/323
[58] Field of Search .............................. 310/323, 328

[56] References Cited

U.S. PATENT DOCUMENTS

| 3,976,342 | 8/1976 | Leyendecker et al. | 384/13 X |
| 4,736,129 | 4/1988 | Endo et al. | 310/323 |
| 4,739,212 | 4/1988 | Imasaka et al. | 310/328 X |
| 4,914,338 | 4/1990 | Murakami | 310/323 |
| 4,926,085 | 5/1990 | Sawayama et al. | 310/323 |

FOREIGN PATENT DOCUMENTS

| 0209865 | 1/1987 | European Pat. Off. | 310/323 |
| 0222394 | 5/1987 | European Pat. Off. | 310/323 |
| 0023379 | 1/1987 | Japan | 310/323 |
| 0053182 | 3/1987 | Japan | 310/323 |
| 0053184 | 3/1987 | Japan | 310/323 |
| 0058887 | 3/1987 | Japan | 310/323 |
| 0107687 | 5/1987 | Japan | 310/323 |
| 0147979 | 7/1987 | Japan | 310/323 |

Primary Examiner—Mark O. Budd
Attorney, Agent, or Firm—Fitzpatrick Cella Harper & Scinto

[57] ABSTRACT

A vibration wave motor has a vibration member of an elastic material, and a sliding member comprising a composite resin having a filler formulated in a resin having a glass transition point of 100° C. or higher secured onto a support comprising an elastic material with good thermal conductivity such as aluminum alloy.

8 Claims, 3 Drawing Sheets

VIBRATION MOTOR

BACKGROUND OF THE INVENTION

1. Field of the Invention

This invention relates to a large output type vibration wave motor which moves by friction a movable member comprising a sliding member and a supporting member by the vibration wave generated on the vibration member by applying an electrical field on an electromechanical energy converting element.

2. Related Background Art

In the prior art, as shown in Japanese Laid-Open Publication No. 62-100178 (FIG. 4), a vibration wave motor is constituted of the basic elements of a vibration member 2A having a super-hard material comprising tungsten carbide and cobalt flame sprayed on an elastic material and a movable member 3A made of an aluminum alloy in pressure contact with one surface of the vibration member surface and subjected to hard alumite treatment, the motor further includes an electromechanical energy converting element 1A arranged and secured on the other surface of the vibration member 2A which generates a surface wave in the circumferential direction of the vibration member in response to an alternating current applied thereto, thereby rotating the movable member 3A in pressure contact with the surface of the vibration member 2A through frictional driving.

However, the vibration wave motor having the movable member 3A with the hard alumite treated film on the surface of the vibration member 2A with the super-hard material film of the above-mentioned prior art example is a medium output type with the starting torque of about 1 kg-cm, and when pressurizing force between the vibration member 2A and the movable member 3A is attempted to be made greater so as to obtain a large output of with a starting torque of about 5 kg-cm abrasion of the hard alumite film of the movable member will abruptly proceed, whereby there is the problem that torque performance is lowered in consequence of the consumption of the film leading to a short useful life for output type vibration wave motors.

To cope with such abrasion of sliding surfaces, there is also a prior art example, in which the movable member is constituted by securing a sliding member of a thin synthetic resin on a support having flexibility (Japanese Laid-Open Publication No. 62-262092).

However, such synthetic resin, as different from a metal material, generally suffers from remarkable fluctuations in material characteristics to temperature changes. For example, in the case of a vibration wave motor of the large output type having rated outputs of 4 kg-cm of torque and about 100 rpm of rotational number, the input is about 15 W, and the temperature of the vibration member becomes as high as 100° C., but the temperature of the sliding member in pressure contact with the sliding surface of the sliding member has been also confirmed to become at least about 100° C., partially because of heat generation accompanied with sliding friction.

Now, if a 66 polyamide resin (hereinafter called nylon 66) belonging to general purpose engineering plastics is employed among crystalline thermoplastic resins for the sliding member material, although the melting point of nylon 66 is high as 260° C., because the glass transition point is about 65° C., physical properties will be markedly lowered and, for example, longitudinal modulus coefficient at 100° C. will become as low as 30% or lower.

FIGS. 2(a) and 2(b) show the sliding surface contact state between the vibration member and the sliding member, FIGS. 2(a) and 2(b) showing the contact state on driving initiation (room temperature) between the metal vibration member 2A and the sliding member 3b comprising nylon 66, indicating the state that the sliding member 3b is slightly lowered by a constant pressurizing force relative to the wave head of the vibration member 2A.

When the temperature of the vibration member 2A reaches steady state of, for example, about 100° C. via a predetermined time after initiation of driving, the flexural modulus of the nylon 66 sliding member 3b becomes smaller.

FIG. 2(b) shows the contact state between the metal vibration member 2A and the nylon 66 sliding member 3b under steady state of, for example, 100° C., and the stress of the nylon sliding member 3b received from the metal vibration member 2A does not change, but only the flexural modulus of the nylon 66 sliding member 3b becomes smaller, whereby the amount of nylon 66 sliding member lowered relative to the metal vibration member 2A becomes greater.

Under the contact state shown in FIG. 2(b), the shearing force which separates the cohesion has become also smaller because the flexural modulus of the nylon 66 sliding member 3b becomes smaller, but the frictional coefficient between the metal vibration member 2 and the nylon 66 sliding member 3b has become greater because the sliding surface area becomes markedly greater, and consequently the frictional driving force becomes greater.

FIG. 3 shows the time fluctuation of torque when the amplitude of the vibration member 2 of the vibration wave motor by use of the nylon 66 sliding member 3b is made constant by a control circuit, and the rotational number is fixed at, for example, 100 rpm, and the torque on initiation of driving becomes greater with lapse of time, until indicating an equilibrium state after about 20 minutes, but also indicating generation of sudden abrupt torque down (see the arrowhead D) during the equilibrium state.

The phenomenon of such torque fluctuation or abrupt torque down is seen in a thermoplastic resin sliding member having a glass transition point of the steady state temperature (for example, 100° C.) of the sliding member 3b, and if the temperature dependency of the material physical properties such as flexural modulus, etc. is great, the torque fluctuation between initiation of driving and steady state is great, which is not desirable for the sliding member material.

Also, if the modulus is further lowered and the amount of the sliding member 3b lowered relative to the vibration member 2 is increased, until lowered to reach ½ of the vibration wave of the vibration member 2, the frictional driving force will become unstable to generate suddenly abrupt torque down phenomenon, which becomes a vital problem to the motor. For prevention of such torque down phenomenon, the pressurizing force of the sliding surface contact can be also reduced, but by reduction of pressurizing force, the important motor performance, namely the rotational number at high torque region, will be lowered.

If the melting point is 100° C. or less, melting of the material occurs and therefore a material having such low melting point cannot be employed as the sliding member material as a matter of course.

As the physical properties which are regarded as important in employing a synthetic resin member for a vibration wave motor, in addition to heat resistance, there are sliding characteristic, thermal conductivity, fatigue resistance, creep resistance, etc.

As the sliding characteristic of a synthetic resin material as the sliding member material, abrasion resistance is important, and also the frictional coefficient value is also an important characteristic in the point of motor performance.

Also, since thermal conductivity of a synthetic resin as the sliding member material is by far smaller than metals, and it is necessary to improve the characteristic so as to dissipate the local heat at the sliding portion, make the temperature distribution of the resin material distribution uniform and lower.

Further, it is necessary to consider sufficiently the fatigue resistance and the creep resistance of a synthetic resin as the sliding member material in the points of life and performance of the sliding member.

SUMMARY OF THE INVENTION

An object of the present invention is to provide a vibration motor with little torque fluctuation.

Another object of the present invention is to provide an abration resistant vibration motor.

Still other objects of the present invention will be apparent from the detailed description given below.

DESCRIPTION OF THE PREFERRED EMBODIMENTS

Figure 1A:
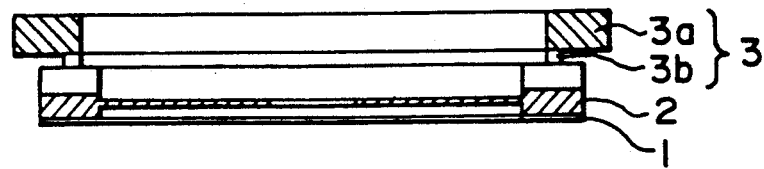
FIGS. 1(a) and 1(b) are sectional view and front view of the principal part of the large output type vibration wave motor of the present invention.
Figure 1B:
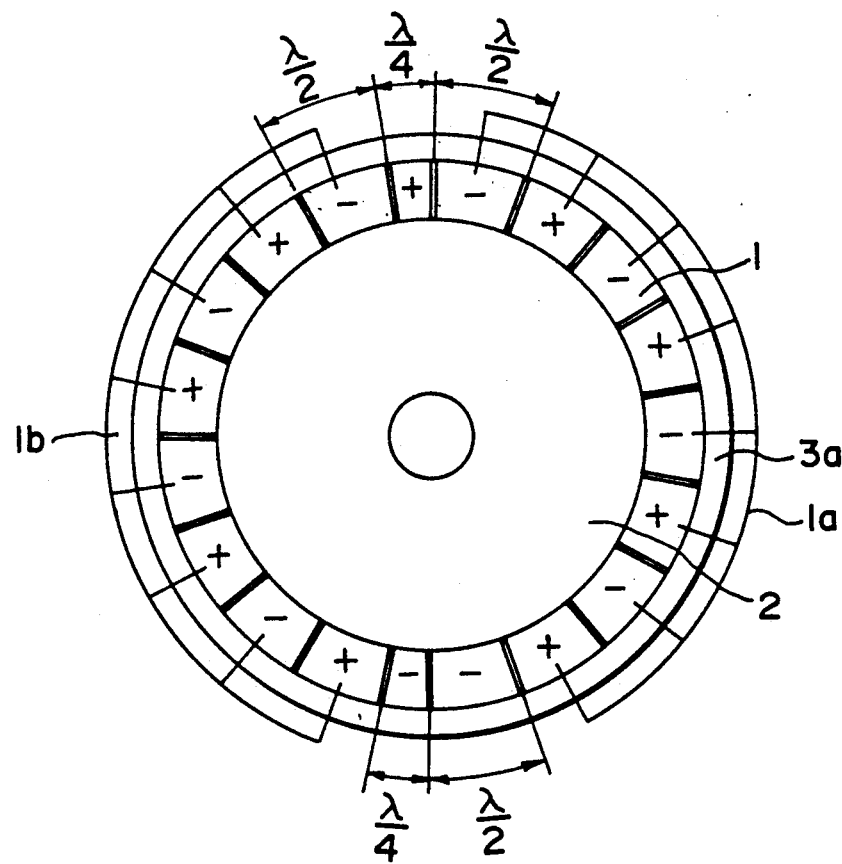
Figure 2A:
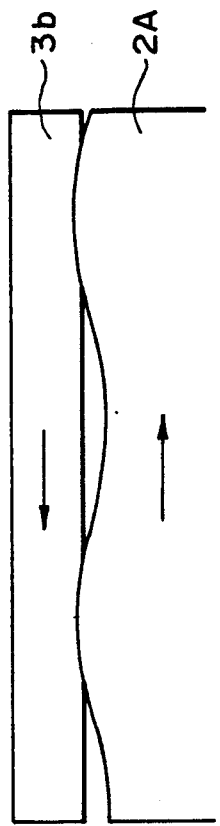
FIGS. 2(a) and 2(b) are diagrams for illustration of the contact state between the vibration surface of the vibration member and the sliding surface of the vibration member.
Figure 2B:
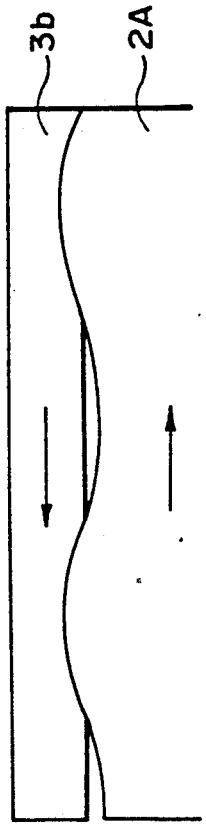
Figure 3:
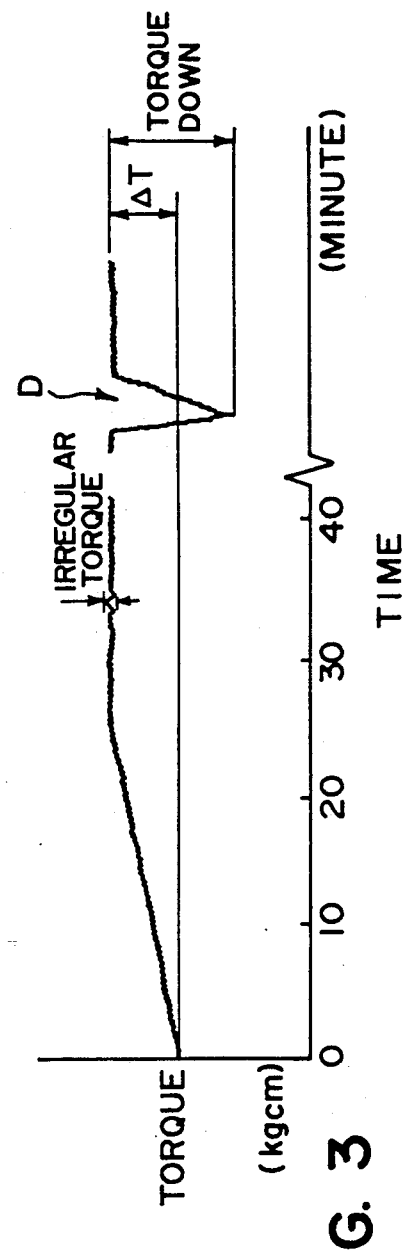
FIG. 3 is a torque characteristic curve for illustration of the torque fluctuation of a prior art example.
Figure 4A:
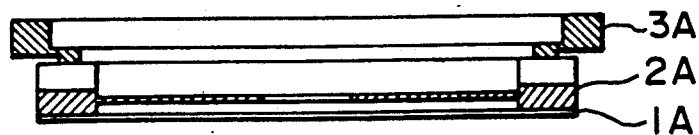
FIGS. 4(a) and 4(b) are sectional view and front view of the principal part of the large output type vibration wave motor of a prior art example.
Figure 4B:
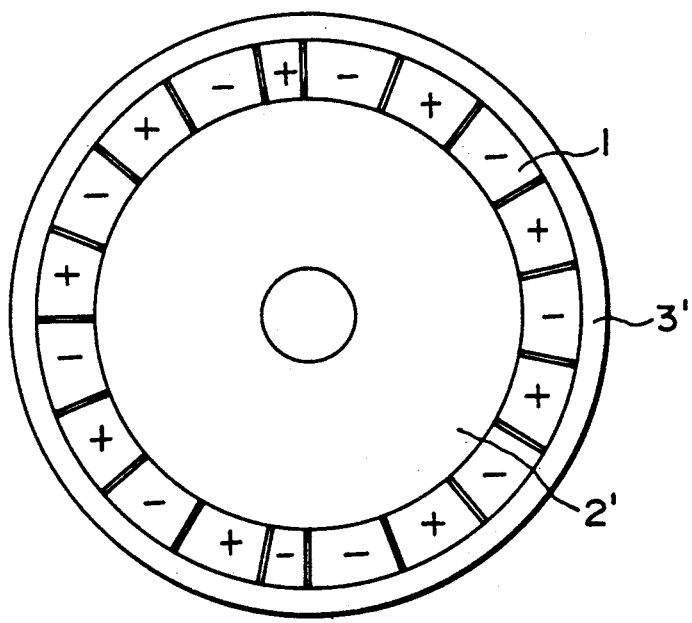

FIGS. 1(a) and 1(b) are sectional view and front view of the principal part of the large output type vibration wave motor, wherein 1 is an electro-mechanical energy converting element polarized into a plurality of thin rings, for example, a piezoelectric element, which are secured concentrically with a heat-resistant epoxy type adhesive on a metal vibration member 2, which is shaped in a ring and has flexibility, such as stainless steel.

The vibration member 2 is fixed on the casing of the vibration wave motor (not shown) in the vicinity of the central portion, and on the sliding surface which is the opposite surface to the surface where the piezoelectric element 1 is fixed, a plurality of comb-shaped grooves for accomodating large vibration amplitude are provided radially toward the axial center.

3a is a ring-shaped support comprising a metal having high thermal conductivity such as aluminum alloy, etc. a ring-shaped sliding member 3b comprising a composite material of a thermoplastic resin is secured on the support 3a concentrically with a heat-resistant epoxy type adhesive material having a glass transition point of 100° C. or higher movable member 3 is formed with these 3a, 3b, and the sliding surface of the sliding member 3b contacts the sliding surface of the vibration member 2 under a pressure of a load of 9 kg concentrically by a means which is also not shown.

In FIGS. 1(a) and 1(b), when frequency voltages different in phase from each other by 90° are applied on the electrodes 1a and 1b subjected alternately to the polarization treatment in the thickness direction, a travelling vibration wave is generated in the circumferential direction at the vibration surface of the vibration member, and by the vibration wave, the movable member 3 in pressure contact with the surface of the vibration member 2 is rotated through the frictional force of the sliding surface between the vibration member 2 and the sliding member 3.

The material of the vibration member 2 is an elastic material such as 36% nickel having particularly small thermal expansion coefficient (Invar) or a martensite type stainless steel having relatively smaller thermal expansion coefficient and small internal loss, etc. When the partner sliding member is a composite resin which is reinforced, the sliding surface is applied with the hardening treatment such as flame spraying of a super-hard material comprising tungsten carbide and cobalt or heat treatment.

The material of the sliding member 3b is a thermoplastic resin having a glass transition point of 100° C. or a composite resin thereof, including specifically natural materials such as amorphous resins such as polyether sulfone (PES), polyarylate (PAR), polyether imide (PEI), polysulfone (PSF), polycarbonate (PC) and modified polyphenylene oxide (modified PPO), etc., crystalline resins such as polyether ether ketone (PEEK), polyphenylene sulfide (PPS) and special polyamide (PA), etc., the non-reinforcement type sliding materials comprising these filled with a fluorine resin such as PTFE, etc. as the lubricant, as well as the reinforced type sliding member materials comprising the above amorphous resins and the crystalline resins filled with carbon fibers and potassium titanate whisker or PTFE.

Table 1 shows the thermoplastic resins and composite resins thereof and their thermal characteristics investigated as the sliding member material of the large output type vibration wave motor.

TABLE 1

|  | Thermoplastic resin | Filler (wt %) | Glass Transition point (°C.) | Melting point (°C.) | Heat distortion temperature (layer load °C.) |
| --- | --- | --- | --- | --- | --- |
| Reference example | PA66 | None | 65 | 260 | 75 |
| Examples |  |  |  |  |  |
| 1 | PEEK | None | 143 | 334 | 152 |
| 2 | PAR | None | 193 | — | 175 |
| 3 | PES | PTFE(5) | 230 | — | 203 |

TABLE 1-continued

|   | Thermoplastic resin | Filler (wt %) | Glass Transition point (°C.) | Melting point (°C.) | Heat distortion temperature (layer load °C.) |
|---|---|---|---|---|---|
| 4 | PEEK | Carbon fiber(30) | 144 | 320 | 280 |
| 5 | " | Carbon fiber(30) + PTFE(5) | 144 | 320 | 280 |
| 6 | " | Potassium titanate whisker(30) + PTFE(5) | 144 | 320 | 247 |
| 7 | PES | Carbon fiber(30) | 230 | — | 217 |
| 8 | Special polyamide | Carbon fiber(20) + Potassium titanate whisker (20) | 125 | 320 | 285 |
| 9 | Special Polyamide | Carbon fiber(20) + Potassium titanate whisker (20) | 100 | 240 | 220 |

Reference, Examples 1 and 2 are natural materials, and Example 3 is a composite resin of an amorphous polyether sulfone (PES) filled with a fluorine resin (PTFE) as the lubricant.

Examples 4 to 9 are the reinforced type composite resins, and as the thermoplastic resin, three kinds of an amorphous polyether sulfone (PES), a crystalline polyether ether ketone (PEEK) and a heat-resistant special polyamide resin are employed, and together with these, carbon fibers and potassium titanate whisker as the reinforcing fibers, and a fluorine resin (PTFE) as the lubricant were used.

Filling of a reinforcing material is first for improvement of abrasion resistance of the resin material, and the filling amount for that purpose should be desirably as much as possible. However, for accomplishing successfully injection molding, the upper limit of the reinforcing material filled based on the thermoplastic resin is about 30% in terms of weight ratio.

Accordingly, the amounts of the reinforcing fiber filled in Examples 4 to 9 were made 30% in terms of weight ratio for single fiber and 40% for a mixture of carbon fiber and potassium titanate whisker.

Filling of a fluorine resin is for improvement of lubricity of sliding, and the filling amount is not required to be made much, and it was made sufficiently about 5% in terms of weight ratio.

Table 2 shows comparison of abrasion amount after a predetermined time (24 hours), time fluctuation of torque, torque irregularity and torque down after motor driving, when ring sliding members with a thickness of 1 mm (see FIG. 1) are formed with thermoplastic resins or composite resins used in Reference example and Examples 1 to 9 shown in Table 1, and the large output type vibration wave motor when the pressurizing force is made 9 kg is driven under a constant vibration amplitude amount.

TABLE 2

|  | Sliding member material | Abrasion Amount | Fine Fluctuation | Torque irregularity | Torque down |
|---|---|---|---|---|---|
| Reference Example | PA66 | Medium | Large | Small | " |
| Example 1 | PEEK | Large | — | — | — |
| Example 2 | PAR | Large | — | — | — |
| Example 3 | PES + PTFE(5) | Medium | Small | Small | Small |
| Example 4 | PEEK + Carbon fiber(30) | Small | Small | Medium | Small |
| Example 5 | PEEK + Carbon fiber(30) + PTFE(5) | Small | Medium | Medium | Small |
| Example 6 | PEEK + Potassium titanate whisker(30) + PTFE(5) | Small | Medium | Small | Small |
| Example 7 | PES + Carbon fiber(30) | Small | Small | Small | Small |
| Example 8 | Special polyamide + Carbon fiber(20) + Potassium titanate whisker(20) | Small | Medium | Small | Small |
| Example 9 | Special polyamide + Carbon fiber(20) + Potassium titanate whisker(20) | Medium | Medium | Small | Small |

To observe first the abrasion of the sliding member under low load (300 g-cm), since both the natural materials of Example 1 are large in abrasion amount, the tests under high load were impossible and intermittent.

On the other hand, PA66 of Reference example, Examples 3 and 9 exhibited moderate amounts of abrasion, and substantially no abrasion was seen in the reinforced type composite resin sliding members of other Examples.

Next, torque fluctuation was examined under high load of 2.5 kg-cm, PA66 of Reference example exhibited clearly time fluctuation during driving as mentioned above, with moderate torque irregularity (torque variance for a short time), and also the phenomenon of torque down was observed.

In Example 3, there was little torque irregularity and no torque down was observed, but the output was considerably small. This is due to small frictional coefficient because abrasion resistance was attempted to be improved by filling of PTFE as the lubricant, and also due to small modulus because of no reinforcement.

Of the reinforced type in Examples 4 to 9, in Examples 3 and 7 by use of a polyether sulfone (PES) which is an amorphous thermoplastic resin and excellent in creep resistance characteristic, both time fluctuation and torque irregularity were small. This is due to the high glass transition point of the polyether sulfone as 225° C., and hence due to small temperature dependency of the physical properties such as flexural modulus, hardness, etc.

Thus, during the time lapse from initiation of motor driving to the time when the sliding member temperature becomes, for example, 100° C., the flexural modulus of the resin sliding member 3b is not lowered, and therefore the lowering amount of the sliding member 3b to the vibration wave of the vibration member is not increased and also there is no lowering in hardness, whereby there is no fluctuation in frictional coefficient and consequently no fluctuation in frictional driving force during large temperature elevation.

Next, in Examples 4, 5 and 6 by use of a polyether ether ketone which is a crystalline thermoplastic resin and excellent in fatigue resistance characteristic, both time fluctuation and torque irregularity are relatively smaller, and also no torque down phenomenon is observed, thus exhibiting remarkable effects as the heat-resistant resin. The carbon fiber and the potassium titanate whisker used as the fillers had remarkable effects in aspect of abrasion resistance with reinforcement of physical properties such as strength, flexural modulus, etc.

The carbon fiber as the filler has been expected to have improvement effect of fatigue resistance or creep resistance, and additionally, the effect of heat dissipation could be also observed due to excellent thermal conductivity. The potassium titanate of Example 6 has been expected to have the improvement effect of fatigue resistance or creep resistance similarly as the carbon fiber, and additionally there was obtained the result of small torque irregularity due to smooth sliding surface because of finer fibers and small orientation characteristic and also due to small variance of frictional coefficient because of uniform reinforcement.

Examples 8 and 9 use a material of a special polyamide (aromatic polyamide) particularly excellent in heat resistance and inexpensive filled with carbon fiber and potassium titanate whisker, and torque irregularity, torque down were extremely small, but the tendency of reduction in torque on initiation of driving which was also observed in Example 6 was observed. In Examples 6, 8 and 9, in which potassium titanate was filled, heat generation at the motor portion was large to give low efficiency. It has been found that this is because of low thermal conductivity of the potassium titanate whisker, whereby heat generation by input and heat dissipation of sliding frictional heat are poor. Accordingly, since the potassium titanate whisker is an effective filler in the point of small variance in frictional coefficient because it is a fine fiber, it has been found the good results can be expected, if it is used in a small amount of 30% or less in the carbon fiber, or a lubricant of high thermal conductivity such as graphite, etc. is used in combination.

The vibration member 2 used in the above investigations is a martensite type stainless steel, with the frictional surface having a super-hard material comprising tungsten carbide and cobalt flame sprayed thereon, its frictional surface hardness is 800 to 1200 in terms of Vickers hardness and its surface roughness is 0.2 S to 0.6 S. Desirably, the frictional surface hardness was found to be about 1200 in terms of Vickers hardness, and further its surface roughness to be about 0.4 S. (See Japanese Industrial Standard, Definitions and Designations of Surface Roughness, JIS B 0601-1982 (reaffirmed: 1987), Section 3.4.3)

When the above-mentioned martensite type stainless steel is subjected to heat treatment, the Vickers hardness becomes about 600, but if the vibration member made of such heat-treated stainless steel, the abrasion amount shown in Table 2 will be generally reduced, and at least all of the sliding member materials by use of the fillers in Examples are usable.

As described above, by use of a thermoplastic resin having a glass transition point of 100° C. or higher, the time fluctuation of torque is reduced and also the phenomenon of torque down is avoided.

Also, by filling the carbon fiber at a ratio of 30% which is the upper limit capable of injection molding, it has been rendered possible to obtain higher abrasion resistance than is aimed at.

Filling of carbon fiber is used for the purpose of making torque higher through improvement of modulus, or improving thermal conductivity, etc., but in another thermosetting resin, it has been confirmed that the increase of abrasion amount is very little in the case of the vibration member made of a stainless steel subjected to the heat treatment as mentioned above, even when the filling amount may be reduced from 30% to 20% or 10%.

On the other hand, in a composite resin filled with a mixture of 30% or less of carbon fiber in terms of weight ratio and 10% or less of potassium titanate whisker also in terms of weight ratio, there is a slight problem in the point of heat dissipation, but it has been found to be effective in the points of reduction of torque irregularity and performance improvement in the higher torque region.

Further, additional filling of a fine fluorine resin of about 5% in terms of weight ratio has been found to form a film of the fluorine resin on the frictional surface of the vibration member, whereby improvement of lubricity can be expected.

On the other hand, a composite resin comprising about 5% of a fluorine resin filled in a thermoplastic resin, although performance may be lowered in higher torque region, is effective in little torque irregularity, and it has been also found to be usable in a soft material such as phosphorus bronze material or a stainless steel material subjected to no heat treatment.

As described above, by forming the sliding member of a composite resin of a thermoplastic resin having a glass transition point of 100° C. or higher, the vibration wave motor suffers from lowering in flexural modulus to negligible extent during the time lapse from initiation of driving to the point when the sliding member temperature becomes steady state, whereby the amount that sliding member to lower into the vibration wave of the vibration member does not change, also without fluctuation of frictional coefficient, and therefore there is no fluctuation of frictional driving force after initiation of driving and hence no time fluctuation of motor torque. Also, no abrupt torque down after equilibrated state is observed, and a reliable vibration wave motor with stable torque characteristics could be obtained. Also, the sliding member of a composite resin comprising carbon fibers or potassium titanate whiskers filled as the reinforcing material alone or as a mixture in a thermoplastic resin having a glass transition point of 100° C. or higher, and further a fluorine resin added as the lubricant therein gave the characteristics improved in aspect of abrasion resistance.

What is claimed is:

1. A vibration wave motor comprising:

(a) a vibration member for generating a vibration wave by an applied electrical signal;

(b) a contacting member having a sliding portion which contacts said vibration member and for receiving the vibration wave generated in said vibration member, wherein said sliding portion consists of a composite resin comprising a filled formulated in a thermoplastic resin having a glass transition point of 100° C. or higher.

2. A vibration wave motor according to claim 1, wherein the composite resin containing said thermoplastic resin is a composite resin comprising 10% to 30% of carbon fibers filled therein in terms of weight ratio.

3. A vibration wave motor according to claim 1, wherein the composite resin containing said thermoplastic resin is a composite resin comprising at least a mixture of 30% or less of carbon fibers and 10% or less of potassium titanate whiskers filled therein in terms of weight ratio.

4. A vibration wave motor according to claim 2 or claim 3, wherein the composite resin containing said thermoplastic resin is a composite resin comprising about 5% of a fluorine resin filled therein in terms of weight ratio.

5. A vibration wave motor according to claim 1, wherein the composite resin containing said thermoplastic resin is a composite resin comprising about 5% of a fluorine resin filled therein in terms of weight ratio.

6. A vibration wave motor comprising:

(a) a vibration member for generating a vibration wave by an applied electrical signal;

(b) a supporting member;

(c) a contacting member for contacting said vibration member and for receiving the vibration wave generated in said vibration member, wherein said contacting member consists of a composite resin comprising a filler formulated in a thermoplastic resin having a glass transition point of 100° C. or higher;

(d) an adhesive means for adhering said contacting means to said supporting member, said adhesive means having a glass transition point of 100° C. or higher.

7. A vibration wave motor comprising:

(a) a vibration means for generating a vibration wave by an applied electrical signal, wherein said vibration means is formed of a martensite type stainless steel having a friction surface of a super-hard material comprising tungsten carbide and cobalt coated by flame spraying, said friction surface having a Vickers' hardness of 800 to 1200 and a surface hardness of 0.2 S to 0.6 S;

(b) a contacting means having a sliding portion which contacts the friction surface of said vibration means and for receiving the vibration wave generated in said vibration means, wherein said sliding portion consists of a composite resin comprising a filler formulated in a resin having a glass transition point of 100° C. or higher.

8. A vibration wave motor comprising:

(a) a vibration means for generating a vibration wave by an applied electrical signal, wherein said vibration means is formed of a martensite type stainless steel;

(b) a contacting means having a sliding portion which contacts a friction surface of said vibration means and for receiving the vibration wave means generated in said vibration means, wherein said sliding portion consists of a composite resin comprising a filler formulated in a resin having a glass transition point of 100° C. or higher.

* * * * *

UNITED STATES PATENT AND TRADEMARK OFFICE
CERTIFICATE OF CORRECTION

PATENT NO. : 5,034,646
DATED : July 23, 1991
INVENTOR(S) : TAKAYUKI SHIRASAKI

Page 1 of 2

It is certified that error appears in the above-identified patent and that said Letters Patent is hereby corrected as shown below:

ON THE COVER PAGE:

At [30] Foreign Application Priority Data

"Jan. 25, 1980 [JP] Japan .... 1-15675" should read
--Jan. 25, 1989 [JP] Japan .... 1-15675--.

At [56]
Attorney, Agent or Firm

Please change "Fitzpatrick Cella Harper & Scinto" to
--Fitzpatrick, Cella, Harper & Scinto--.

COLUMN 1,
Line 20, "surface" should be deleted;
Line 21, "treatment, the" should read --treatment. The--;
Line 39, "5 kg-cm abrasion" should read --5 kg-cm, abrasion--; and
Line 43, "for output" should read --for large output--.

COLUMN 3,
Line 28, "abration" should read --abrasion--.

COLUMN 4,
Line 4, "accomodating" should read --accommodating--;
Line 8, "a" (first occurrence) should read --A--;
Line 12, "higher movable" should read --higher. A movable--;

UNITED STATES PATENT AND TRADEMARK OFFICE
CERTIFICATE OF CORRECTION

PATENT NO. : 5,034,646　　　　　　　　Page 2 of 2
DATED : July 23, 1991
INVENTOR(S) : TAKAYUKI SHIRASAKI It is certified that error appears in the above-identified patent and that said Letters Patent is hereby corrected as shown below:

COLUMN 5,
　　　Line 17, "Reference," should read --Reference--.

COLUMN 8,
　　　Line 4, "made" should read --is made--; and
　　　Line 52, "sliding member to lower" should read
　　　　　　--the sliding member lowers--.

COLUMN 10,
　　　Line 5, "means" should read --member--;
　　　Line 16, "hardness" should read --roughness--; and
　　　Line 32, "means" should be deleted.

Signed and Sealed this

First Day of June, 1993

Attest:

*Attesting Officer*

MICHAEL K. KIRK

*Acting Commissioner of Patents and Trademarks*